(12) United States Patent
Tcherniguin et al.

(10) Patent No.: US 11,745,834 B2
(45) Date of Patent: Sep. 5, 2023

(54) MONITORING SYSTEM AND METHOD FOR VESSEL MOORING WITH POSITION AND YAW, ROLL, AND PITCH ROTATIONAL MOTION

(71) Applicant: TECHNIP FRANCE, Courbevoie (FR)

(72) Inventors: Nicolas Tcherniguin, Paris (FR); Djoni Eka Sidarta, Houston, TX (US); Johyun Kyoung, Katy, TX (US); Ho Joon Lim, Katy, TX (US)

(73) Assignee: Technip Energies France, Courbevoie (FR)

( * ) Notice: Subject to any disclaimer, the term of this patent is extended or adjusted under 35 U.S.C. 154(b) by 314 days.

(21) Appl. No.: 17/286,307

(22) PCT Filed: Oct. 21, 2019

(86) PCT No.: PCT/IB2019/001462
§ 371 (c)(1),
(2) Date: Apr. 16, 2021

(87) PCT Pub. No.: WO2020/161517
PCT Pub. Date: Aug. 13, 2020

(65) Prior Publication Data
US 2021/0339831 A1    Nov. 4, 2021

Related U.S. Application Data

(60) Provisional application No. 62/748,787, filed on Oct. 22, 2018.

(51) Int. Cl.
*B63B 21/50* (2006.01)
*B63B 79/30* (2020.01)
(Continued)

(52) U.S. Cl.
CPC .............. *B63B 21/50* (2013.01); *B63B 79/10* (2020.01); *B63B 79/30* (2020.01); *B63B 2021/008* (2013.01); *B63B 2021/009* (2013.01)

(58) Field of Classification Search
CPC ......... B63B 21/50; B63B 79/10; B63B 79/30; B63B 2021/008; B63B 2021/009; B63B 2021/003; B63B 2035/448; G01S 19/14
See application file for complete search history.

(56) References Cited

U.S. PATENT DOCUMENTS

| 3,913,396 A | 10/1975 | Elliot |
| 5,222,453 A | 6/1993 | Chabot |

(Continued)

FOREIGN PATENT DOCUMENTS

| AU | 2016295135 B2 | 5/2019 |
| CA | 2992984 C | 1/2020 |

(Continued)

OTHER PUBLICATIONS

International Search Report and Written Opinion of the International Searching Authority, International Application No. PCT/US2016/042214, dated Oct. 13, 2016 by Barre, V.

(Continued)

*Primary Examiner* — Anthony D Wiest
(74) *Attorney, Agent, or Firm* — Kilpatrick Townsend & Stockton, LLP (57) ABSTRACT

The present disclosure provides a system and method for monitoring a floating vessel hull mooring system by determining one or more hull rotational motions of yaw, roll, and/or pitch that do not require independent knowledge of environmental conditions. The hull rotational motion of a secure and intact mooring system can be calculated and/or established experientially over time by measuring movement of the hull to characterize the hull rotational motion at (Continued)

given geographical positions. A compromised mooring system will result in different hull rotational motion of at least one of yaw, roll, and/or pitch. By monitoring the hull rotational motion for a given geographical position to be compared to the theoretical values (and/or previous recorded values), it is then possible to assess that at least a portion of the mooring system has been compromised and in at some embodiment indicate which portion of the mooring system has been compromised.

19 Claims, 8 Drawing Sheets

(51) Int. Cl.
*B63B 79/10* (2020.01)
*B63B 21/00* (2006.01)

(56) References Cited

U.S. PATENT DOCUMENTS

| | | | |
|---|---|---|---|
| 5,506,588 | A | 4/1996 | Diefes et al. |
| 7,034,680 | B2 | 4/2006 | Grunder |
| 9,261,880 | B2 | 2/2016 | Seo et al. |
| 9,671,231 | B2 * | 6/2017 | O'Sullivan, Jr. ....... G01S 19/42 |
| 2006/0207488 | A1 | 9/2006 | Haas |
| 2009/0084302 | A1 | 4/2009 | Daran et al. |
| 2009/0115622 | A1 | 5/2009 | Michie et al. |
| 2010/0186652 | A1 | 7/2010 | Martin |
| 2013/0239649 | A1 | 9/2013 | Jamieson |
| 2014/0338581 | A1 | 11/2014 | Gill et al. |
| 2015/0017849 | A1 | 1/2015 | Knezek et al. |
| 2015/0246711 | A1 | 9/2015 | Lee |
| 2022/0242533 | A1 * | 8/2022 | Tolley ................. B63B 79/10 |

FOREIGN PATENT DOCUMENTS

| | | | |
|---|---|---|---|
| EP | 3325337 | B1 | 7/2019 |
| JP | 62-46797 | A | 2/1987 |
| KR | 102163910 | B1 * | 10/2020 ............ B63B 21/50 |
| RU | 2696146 | C1 | 7/2019 |
| WO | 9954198 | A1 | 10/1999 |
| WO | 2008129323 | A1 | 10/2008 |
| WO | 2017015041 | A1 | 1/2017 |

OTHER PUBLICATIONS

A. Magee, A. Sablok, J. Gebara, "Mooring Design for Directional Spar Hull VIV", Offshore Technology Conference, May 5, 2003, 6 pages.

F. Kaster, M. Barros, R. Rossi, I. Masetti, Petrobras, E. Falkenberg, S. Karlsen, Marintek, I. Waclawek, Braslfex, "DICAS—A New Mooring Concept for FPSO's", Offshore Technology Conference, (May 5-8, 1997), 15 pages.

International Search Report and Written Opinion of the International Searching Authority, International Application No. PCT/IB2019/001462, dated Sep. 30, 2020 by Schmitter. T.

* cited by examiner

MONITORING SYSTEM AND METHOD FOR VESSEL MOORING WITH POSITION AND YAW, ROLL, AND PITCH ROTATIONAL MOTION

CROSS REFERENCE TO RELATED APPLICATIONS

This application claims the benefit of U.S. Provisional Application No. 62/748,787, filed Oct. 22, 2018, the entire contents of which are hereby incorporated by reference.

STATEMENT REGARDING FEDERALLY SPONSORED RESEARCH OR DEVELOPMENT

Not applicable.

REFERENCE TO APPENDIX

Not applicable.

BACKGROUND OF THE INVENTION

Field of the Invention

The disclosure generally relates to the mooring systems for floating vessels. Specifically, the disclosure relates to monitoring the condition of a mooring system for the hull of a floating vessel, including an offshore platform, floating production storage and offloading units and other vessels, based on the hull's rotational motions relative to its position.

Description of the Related Art

In the field of offshore oil and gas production, a variety of floating vessels having hulls are used generally in deeper waters in which support from the sea bed is impractical. Such floating vessels, for example, include a floating drilling and/or production unit (FPU), deep draft floater (DDF, such as Spars), tension leg platform (TLP), semi-submersible (Semi), floating production storage and offloading unit (FPSO), floating storage and offloading unit (FSO), and other vessels can also be similarly moored.) Typically, a floating vessel for production (and drilling) is moored to the sea bed by means of multiple mooring lines attached from the vessel's hull, directly or indirectly from intervening structure, to sea bed anchors. Such anchors may typically be pile anchors, suction anchors, or self-burying anchors of conventional type and that maintain the floating vessel in a desired location. Some of the vessels have turrets from which risers and other production equipment are coupled to subsurface wells, while the vessel itself may rotate around the turret. The turrets is moored for stability of the production equipment. The mooring line system can be a Taut or Semi-Taut or Taut Catenary or pure Catenary system.

Figure 1:
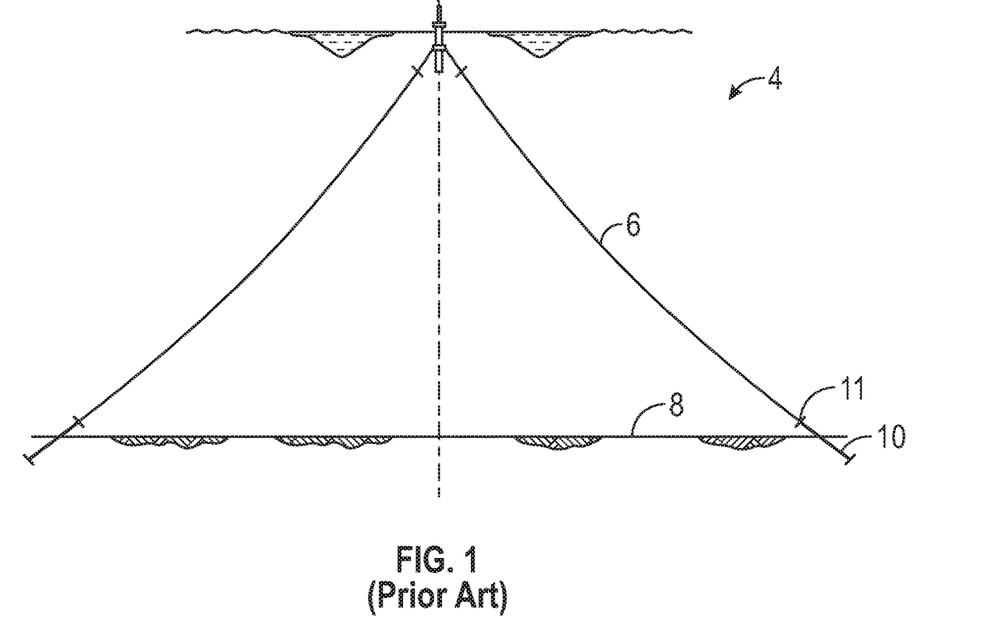
FIG. 1 is schematic side view of a typical mooring system used for a floating vessel.
Figure 2:
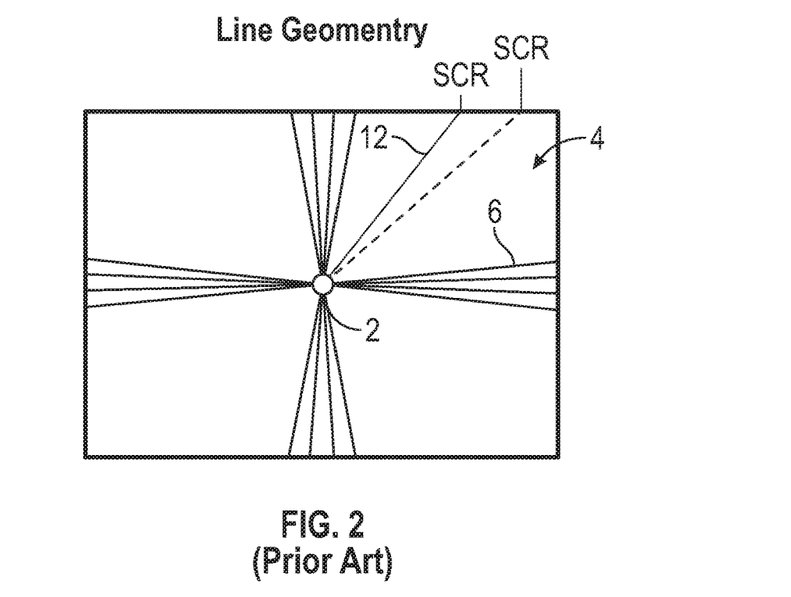
FIG. 2 is a schematic top view of the typical mooring system with the floating vessel.

An example of a typical mooring system for a Spar is illustrated in FIG. 1 and FIG. 2. FIG. 1 is schematic side view of a typical mooring system used for a floating vessel. FIG. 2 is a schematic top view of the typical mooring system with the floating vessel. The vessel 2 is held in a relative stable position while being allowed to float and move with the currents through a mooring system 4. A plurality of mooring lines 6 is stretched radially outwardly to a sea bed 8 and held at a mooring point 11 (such as an eye or other attachment means) on a pile or other anchoring device 10. Multiple mooring lines can extend from a given side and most often extend in multiple directions from the vessel as shown particularly in FIG. 2.

It is important that the mooring system is monitored in order to determine whether a line has been damaged, has come loose from its anchoring point on the sea bed, or if the anchoring points have moved. If a single mooring line or its anchoring point is damaged in this way, the effect on the position of the vessel may not be particularly noticeable, but such damage must be recognized early in order that remedial action can be taken before further damage may allow the vessel to break free from its moorings and/or generate damage to the riser/export systems that are crucial to the production.

Historically, a typical mooring system failure is discovered during inspection by a diver or ROV. Some systems monitor the integrity of the mooring lines by a load cell or a compressive cell located either on the mooring line or on guiding/supporting equipment or at the tensioning system, by installing an inclinometer along the mooring line, or by installing a sonar deployed beneath the vessel. Such monitoring systems are expensive, complicated to install and maintain, and vulnerable to damage considering that they are installed underwater or close to water.

A further alternative for monitoring mooring systems is shown in US Publication No. 2010/0186652. The abstract states that the method of monitoring a vessel mooring system involves determining the geographical position of a locating point on the vessel remote from the mooring point and determining the heading of the vessel. The geographical position of the mooring point is then calculated from the determined position of the locating point and the vessel heading. The position of the mooring point is compared to at least one expected position of the mooring point, in order to provide an indication of failure of a mooring line or anchor. Because the geographical position varies with environmental conditions such as current flow and direction, wind speed and direction, and so forth, the geographical location by itself related to monitoring a mooring system would appear to have limited accuracy.

Vessels have their natural period in sway and surge (horizontal displacement) mainly linked to the stiffness of their mooring system. The mooring system causes the sway natural period to vary as a function of direction (that is, "heading" as defined as the angle between the direction in which the object's nose is pointing and a reference direction, such a true north). Different floating vessels have different modes of movement at different headings. Further, the typical presence of risers, such as riser 12 in FIG. 2, results in an unsymmetrical inclination of the vessel to sway in the natural period with some directional dependence at a lower order.

A paper entitled "Mooring Design for Directional Spar Hull VIV" published at the Offshore Technology Conference in 2003 in Houston, Tex. as OTC 15243-MS (available at https://www.onepetro.org/conference-paper/OTC-15243-MS) discusses the effect of vortex induced vibrations (VIV) on a Spar mooring system when the Spar is fitted with helical strakes around the outer surface of the submerged hull and the effect on the natural period. The article discusses on page 2 one methodology of calculating Spar offsets due to imposed environmental current load and direction and drag loads due to hull VIV. The Spar sway natural period is determined based on the calculated offset and the mooring stiffness, and varies depending on whether the sway is in-line or out-of-line with the mooring lines. In addition to the above paper not teaching monitoring mooring systems for degradation, the above paper aspects of natural periods but, like US Publication No. 2010/0186652, requires environmental factoring to achieve its results.

A recent patent U.S. Pat. No. 9,671,231 discloses a system and method of monitoring a mooring system for a floating vessel using the time of the natural period independent of environmental conditions. The natural period can be calculated and/or established experientially over time by measuring movement of the vessel to establish the natural period at given geographical positions of a secure and intact mooring system. The natural period can be monitored based on the time to complete a natural period. A change in a mooring line stiffness, whether by a failure, stretching, a degradation of the mooring line integrity, or a significant displacement of the anchoring point, will be translated into a different natural period with a different time. By monitoring the natural period for a given geographical position (and corresponding heading) to be compared to the theoretical values (and/or previous recorded values) it is then possible to assess that at least a portion of the mooring system has failed or that a significant damage has occurred. The use of the natural period for a given geographical position (and corresponding heading) avoided accounting directly for environmental conditions.

However, there remains then a need to provide more simplified yet predictable monitoring mooring system and method.

BRIEF SUMMARY OF THE INVENTION

The present disclosure provides a system and method for monitoring a floating vessel hull mooring system by determining one or more hull rotational motions of yaw, roll, and/or pitch that do not require independent knowledge of environmental conditions. The hull rotational motion of a secure and intact mooring system can be calculated and/or established experientially over time by measuring movement of the hull to characterize the hull rotational motion at given geographical positions. For example, the yaw can be determined by GPS monitoring systems or other location determining systems, and the roll and/or pitch can be experientially determined by sensors, such as inclinometers or an inertial motion unit(s), also known as inertial measurement unit(s) or an "IMU". This approach does not require independent monitoring of the environment conditions. Rather, the variables can be determined by direct measurements of the vessel hull's floating performance while moored. A compromised mooring system will result in different hull rotational motion of at least one of yaw, roll, and/or pitch. A failure, stretching, degradation of the mooring line integrity, or significant displacement of the anchoring point will be translated into a different values of the hull's yaw, roll, and/or pitch. By monitoring the hull rotational motion for a given geographical position to be compared to the theoretical values (and/or previous recorded values), it is then possible to assess that at least a portion of the mooring system has been compromised and in at some embodiment indicate which portion of the mooring system has been compromised.

The disclosure provides a method of monitoring for changes in a mooring system for a floating hull, the mooring system having at least one mooring line coupled between the hull and an anchor having a mooring point to which the at least one mooring line is coupled, the method comprising: determining and recording a geographical position of a locating point on the hull to establish a baseline geographical position; determining and recording at least one type of an associated rotational motion of the hull at the baseline geographical position to establish an associated baseline hull rotational motion; and comparing an operational geographical position and associated hull rotational motion to reference data of the baseline geographical position and associated baseline hull rotational motion corresponding to an undamaged mooring system to provide an indication of a change in the mooring line stiffness, mooring line pretension, the anchor location, or a combination thereof.

The disclosure also provides a method of monitoring the mooring line stiffness shift, mooring line material creeping of a moored hull, or a combination thereof, the hull having a mooring point to which the mooring line is connected, the method comprising: determining a geographical position and at least one type of an associated hull rotational motion of the hull; and using a determined shift in the geographical position and associated hull rotational motion to determine the stiffness variation of the mooring lines.

The disclosure further provides a method of monitoring the riser/export system stiffness shift of a moored hull having a mooring point to which the mooring line is connected, the method comprising: determining a geographical position and at least one type of an associated hull rotational motion of the hull; and using a determined shift in the geographical position and associated hull rotational motion to determine the stiffness variation of the riser/export system.

The disclosure provides a system for monitoring for changes in a mooring system for a floating hull, the mooring system having at least one mooring line coupled between the hull and an anchor having a mooring point to which the at least one mooring line is coupled, the system comprising a satellite positioning device and a data processing system configured to: determine a geographical position of a locating point on the hull from the satellite positioning device; determine at least one type of an associated hull rotational motion of the hull at the given geographical position; and compare the geographical position of the hull and its associated hull rotational motion to an expected set of data to provide an indication of a stiffness of the mooring line or a change of the anchor.

BRIEF DESCRIPTION OF THE SEVERAL VIEWS OF THE DRAWINGS

The patent or application file contains at least one drawing executed in color. Copies of this patent or patent application publication with color drawing(s) will be provided by the Office upon request and payment of the necessary fee.

DETAILED DESCRIPTION

The Figures described above and the written description of specific structures and functions below are not presented to limit the scope of what Applicant has invented or the scope of the appended claims. Rather, the Figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present disclosure will require numerous implementation-specific decisions to achieve the developer's ultimate goal for the commercial embodiment. Such implementation-specific decisions may include, and likely are not limited to, compliance with system-related, business-related, government-related, and other constraints, which may vary by specific implementation or location, or with time. While a developer's efforts might be complex and time-consuming in an absolute sense, such efforts would be, nevertheless, a routine undertaking for those of ordinary skill in this art having benefit of this disclosure. It must be understood that the inventions disclosed and taught herein are susceptible to numerous and various modifications and alternative forms. The use of a singular term, such as, but not limited to, "a," is not intended as limiting of the number of items. Further, the various methods and embodiments of the system can be included in combination with each other to produce variations of the disclosed methods and embodiments. Discussion of singular elements can include plural elements and vice-versa. References to at least one item may include one or more items. Also, various aspects of the embodiments could be used in conjunction with each other to accomplish the understood goals of the disclosure. Unless the context requires otherwise, the term "comprise" or variations such as "comprises" or "comprising," should be understood to imply the inclusion of at least the stated element or step or group of elements or steps or equivalents thereof, and not the exclusion of a greater numerical quantity or any other element or step or group of elements or steps or equivalents thereof. The term "coupled," "coupling," "coupler," and like terms are used broadly herein and may include any method or device for securing, binding, bonding, fastening, attaching, joining, inserting therein, forming thereon or therein, communicating, or otherwise associating, for example, mechanically, magnetically, electrically, chemically, operably, directly or indirectly with intermediate elements, one or more pieces of members together and may further include without limitation integrally forming one functional member with another in a unity fashion. The coupling may occur in any direction, including rotationally. The device or system may be used in a number of directions and orientations. The order of steps can occur in a variety of sequences unless otherwise specifically limited. The various steps described herein can be combined with other steps, interlineated with the stated steps, and/or split into multiple steps. Some elements are nominated by a device name for simplicity and would be understood to include a system or a section, such as a processor would encompass a processing system of related components that are known to those with ordinary skill in the art and may not be specifically described. Various examples are provided in the description and figures that perform various functions and are non-limiting in shape, size, description, but serve as illustrative structures that can be varied as would be known to one with ordinary skill in the art given the teachings contained herein.

The present disclosure provides a system and method of monitoring a mooring system for a floating vessel hull using the yaw, roll, or pitch or a combination thereof of the hull, independent of environmental conditions. These variables represent simplified yet important determinants of the integrity of mooring lines. For example, the yaw can be determined by GPS monitoring systems or other location determining systems, and the roll and/or pitch can be experientially determined by sensors, such as inclinometers or an inertial motion unit(s), also known as inertial measurement unit(s) or an "IMU". An inertial measurement unit (IMU) is an electronic device that can measure and report a body's specific force, angular rate, and sometimes the orientation of the body, using a combination of accelerometers, gyroscopes, and sometimes magnetometers. An inertial measurement unit works by detecting linear acceleration using one or more accelerometers and rotational rate (angular velocity) using one or more gyroscopes. Some also include a magnetometer which is commonly used as a heading reference. Typical configurations contain one accelerometer, gyroscope, and sometimes magnetometer per axis for each of the three principal axes: pitch, roll and yaw. If just the accelerometer and gyroscope for each axis is used, then the measurement and determination can be of six degrees of freedom, and if the magnetometer is added per axis, then the measurement and determination can be of nine degrees of freedom. This approach does not require monitoring directly the environment conditions. Rather, the variables can be determined by direct measurements of the vessel hull's floating performance while the vessel or its hull is moored. A change in a mooring line stiffness, whether by a failure, stretching, a degradation of the mooring line integrity, or a significant displacement of the anchoring point, will be translated into a different values of the hull's yaw, roll, and/or pitch. For example, the hull's yaw, roll, or pitch can be a good indicator for mooring line integrity for small to medium sea states, but for high sea states combined use of two or more of the listed variables can provide higher accuracy without knowing the environment direction. The hull's yaw, roll and/or pitch angles can be compared to the theoretical values (and/or previous recorded values) to assess that at least a portion of the mooring system has failed or that a significant damage has occurred.

Figure 3:
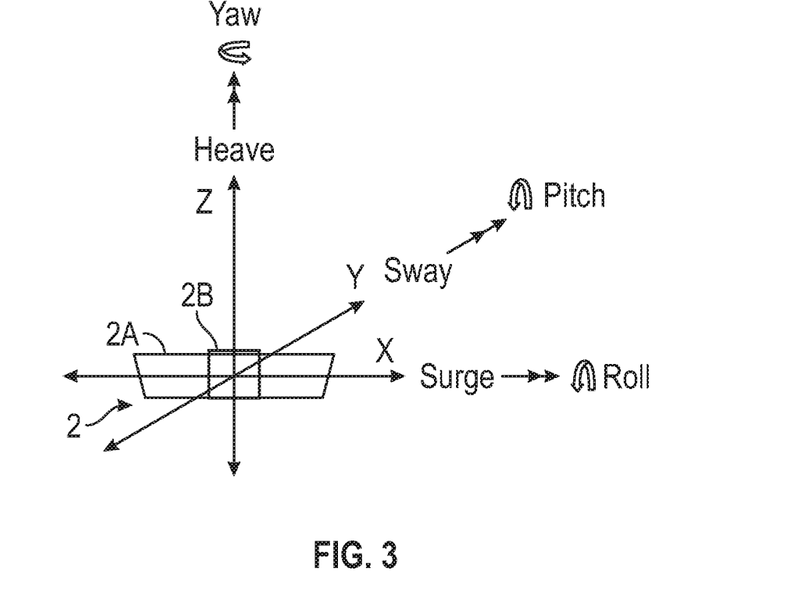
FIG. 3 is a schematic diagram of an x, y, z-axis coordinate system for yaw, roll and pitch as used herein.

FIG. 3 is a schematic diagram of an x, y, z-axis coordinate system for yaw, roll and pitch as used herein. Vessel motions are defined by six degrees of freedom. There are three special axes in any vessel, called longitudinal axis (hull front-back or bow-stern) (x-axis), transverse axis (side-to-side or port-starboard) (y-axis), and vertical (z-axis). Three motions are rotational and three motions are translational. The three rotational motions around the longitudinal, transverse, and vertical axes are known as roll, pitch, and yaw, respectively. Roll is the tilting rotation of a vessel about its longitudinal/x-axis. Pitch is the up/down rotation of a vessel about its transverse/y-axis. Yaw is the turning rotation of a vessel about its vertical/z-axis. The three translational motions around the longitudinal, transverse, and vertical axes are known as surge, sway, and heave. Surge is the linear motion along the longitudinal/x-axis. Sway is the linear motion along the transverse/y-axis. Heave is the vertical (up/down) motion along the vertical/z-axis. The present invention is primarily addressing the use of the rotational motions to monitor the vessel's mooring system.

The invention can use the yaw, roll, and/or pitch angles of the hull 2 alone or in combination at given hull positions to determine the mooring system condition. In the case of most vessels 2A that have risers or other production equipment extending subsea so the vessel 2A itself is moored, the yaw, roll, and pitch angles of the vessel hull are herein defined as the yaw, roll, and pitch angles of the hull 2. Some vessels, such as an FPSO, have a turret or other similar production structure 2B that has risers and other production equipment extending subsea therefrom. In those embodiments, the production structure is generally moored for stability, and the vessel 2A is allowed to rotate relative to the production structure 2B. For monitoring the mooring system, it is more appropriate to focus on the production structure 2B movements, rather than the more freely rotating vessel 2A movements around the production structure In such embodiments, the yaw, roll, and pitch angles of the production structure hull 2B are defined as the yaw, roll, and pitch angles of the hull 2. Therefore, the "hull" as used herein will refer to either the vessel hull or the production structure hull of the vessel, if the production structure is moored.

Figure 4:
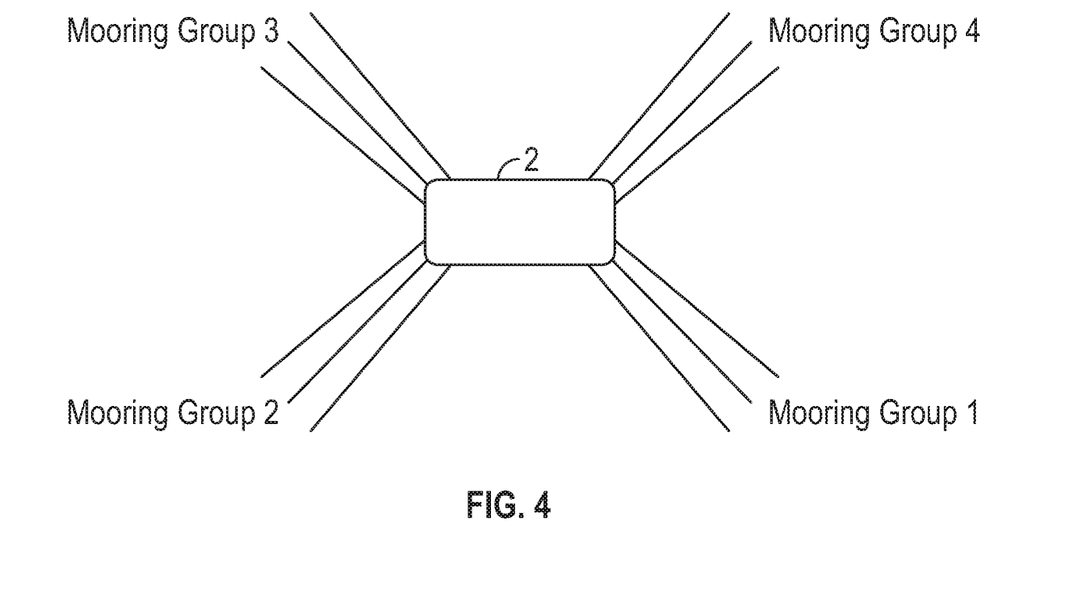
FIG. 4 is a schematic diagram of an illustrative mooring system for a hull for reference in the charts described herein.

FIG. 4 is a schematic diagram of an illustrative mooring system for a hull for reference in the charts described herein. The hull 2 is shown in this example with four mooring groups. The number of mooring groups and mooring lines varies depending on the vessel used and is illustrative for describing the following charts that illustrates the hull motions relative to changes in the yaw, roll, and pitch when a given group is compromised. Using the orientation of the Figure, Mooring Group 1 (MG1) is illustrated in the bottom right position of the hull. Mooring Group 2 (MG2) is illustrated in the bottom left position of the hull. Mooring Group 3 (MG3) is illustrated in the top left position of the hull. Mooring Group 4 (MG4) is illustrated in the top right position of the hull.

Figure 5:
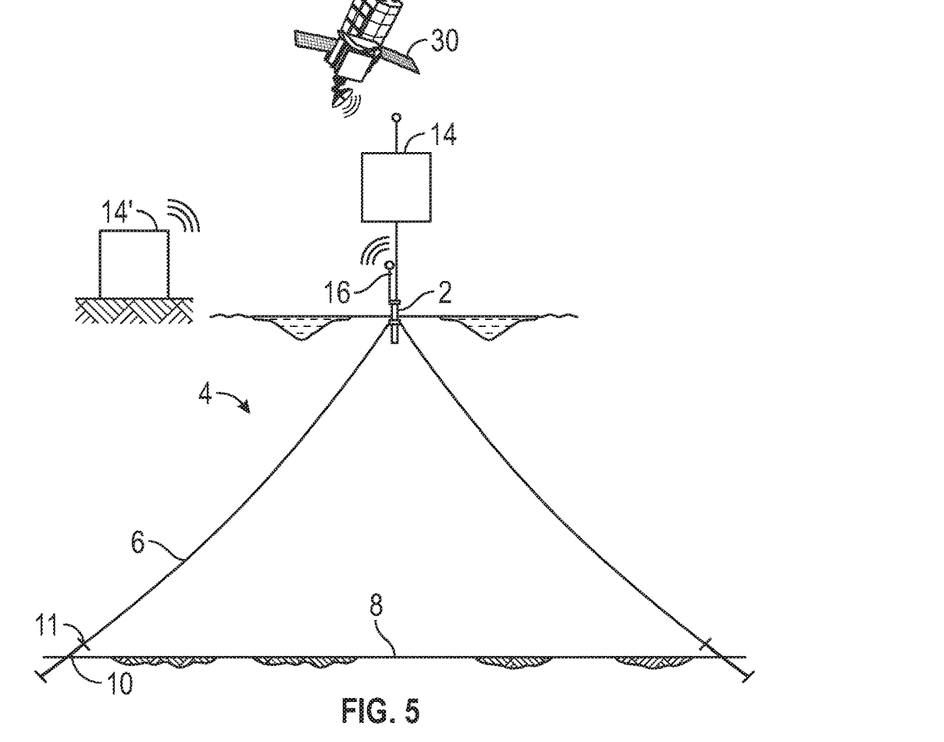
FIG. 5 is a schematic elevation view of an illustrative hull coupled with a hull rotational motion mooring monitoring system of the invention.

FIG. 5 is a schematic elevation view of an illustrative hull coupled with a hull rotational motion mooring monitoring system of the invention. The hull 2 is moored with a mooring system 4 having mooring lines 6 coupled to the sea bed 8 at the mooring points 11 of the anchoring devices 10 of various types (herein, "anchors"). The hull rotational motion monitoring system 14 can be coupled to the hull 2. It is envisioned that the invention is a "dry" system, that is, the equipment can be located above the water and sensitive equipment may be positioned for example in a controlled environment, where the likelihood of damage is vastly reduced and maintenance easy to perform in comparison with systems located underwater. Alternatively, one or more portions of the hull rotational motion monitoring system 14' can be located remotely from the hull and can be in communication with the hull for data, voice, and/or other transmission or receipt of information such as through an antenna 16, cable, laser, fiber, or other means to communicate. The system 14 can also include geographical position determining devices for establishing the hull position that can be associated with any hull rotational motion. Determinations of geographical positions can be made by means of satellite positioning systems, such as by use of the Global Positioning System (GPS) or Differential Global Positioning System (DGPS) 30.

Figure 6:
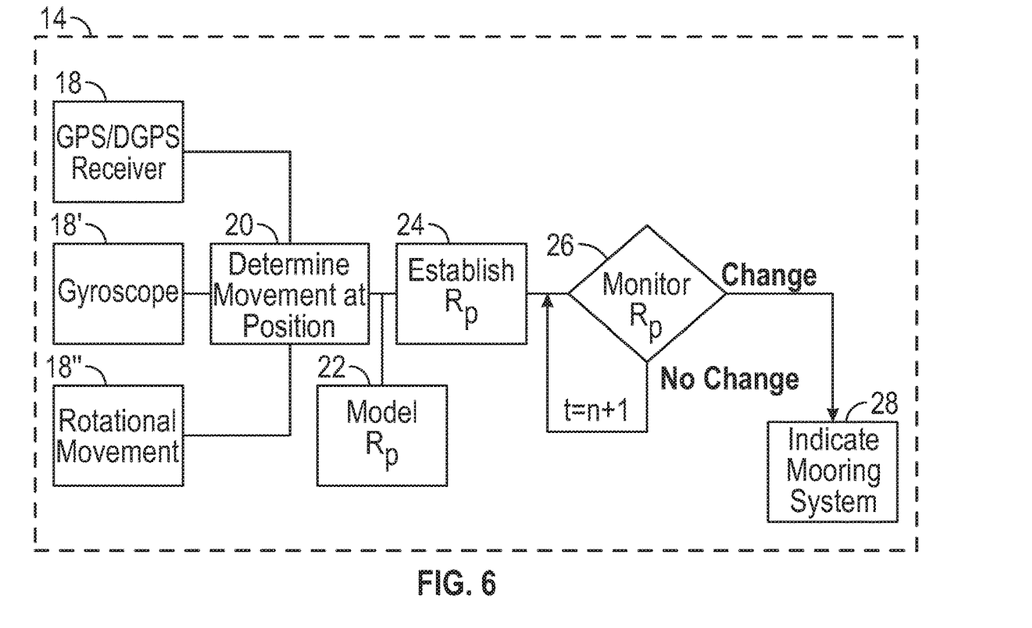
FIG. 6 is a flow chart of an illustrative method of using the yaw, roll, and/or pitch of the hull to monitor the condition of the hull mooring system.

FIG. 6 is a flow chart of an illustrative method of using the yaw, roll, and/or pitch of the hull to monitor the mooring system of the hull. It is possible, in real time, to assess whether the actual hull location and associated hull rotational motion data are in-line with the expected (theoretical and/or previously recorded) reference data. The hull rotational motion monitoring system 14 can include processors, databases, and input and output means to process and respond to data regarding the hull rotational motion of the hull and the relationship to the mooring system condition. For example, a GPS or DGPS receiver 18 can be used to track the hull geographical position at various times to establish an associated hull rotational motion at that position by analyzing the hull rotational motion as a function of time. The hull rotational motion can be related to yaw, roll, and/or pitch. A gyroscope 18' can be used to measure direction in addition to or in lieu of the GPS receiver 18. Other systems and devices 18", including an IMU, for measuring hull rotational motion can be used to determine the associated hull rotational motion at the relevant position in step 20. An IMU can be likewise used for changes in the geographical position, such as by measuring linear acceleration particularly over a time period. Alternatively, the hull rotational motion can be theoretically modeled in step 22 using known formula and parameters of the hull in step 22. Enhanced post processing can, after a period of time, replace the theoretical values by recorded actual values, and therefore give a generally more accurate and realistic set of reference data of expected geographical positions with associated hull rotational motions. The modeled information can be provided to establish the hull rotational motion at a given position, Rp, in step 24 in conjunction with, or in lieu thereof, the actual hull rotational motion determination the step 20. Once the hull rotational motion is established, then the system can monitor an operational hull rotational motion for a given geographical position periodically for any changes in step 26. If there are no changes, then the system indexes to monitor the system again at a later time. If there are changes in the hull rotational motion for the given geographical position in step 28, the system can indicate a change to a user and/or to a processor or another device for additional actions, including coupled the system to the hull control/alarm system.

If it appears that the actual data is not corresponding with the expected data, it is then possible to indicate which mooring line or anchor has encountered a damage. The approximate indication of the mooring line or anchor may be achieved by comparing actual data with theoretical values computed using the hull analytical model considering line failure cases (or actual values if available) for a damaged mooring system. In some systems, an automated change could be made on other mooring lines to re-establish the stiffness of the mooring system and thus re-establish the hull rotational motion prior to the change.

Beyond mooring line and anchor failure detection, the hull rotational motion monitoring system 14 can be used to indicate when stretching/creeping occurs such as when polymer mooring lines are used, and re-tensioning of one or more mooring lines is needed. For example, the comparison of the operational position of the hull to the baseline position can include determining the distance of the mooring point on the hull from the anchor points of the mooring lines. Similarly, the invention can be used to associate a change in the riser/export system stiffness. The monitoring system can also be used to estimate fatigue of hull components. Accurate recording of a hull's geographical position with a variation around a mean position and corresponding rotational motion allow through enhanced post processing using reference databases based on modeling to cumulate fatigue of hull components directly affected by the motions of the hull. This fatigue analysis enables determination of the actual fatigue consumption on a continuous basis and associated remaining life by the rotational motion.

Figure 7A:
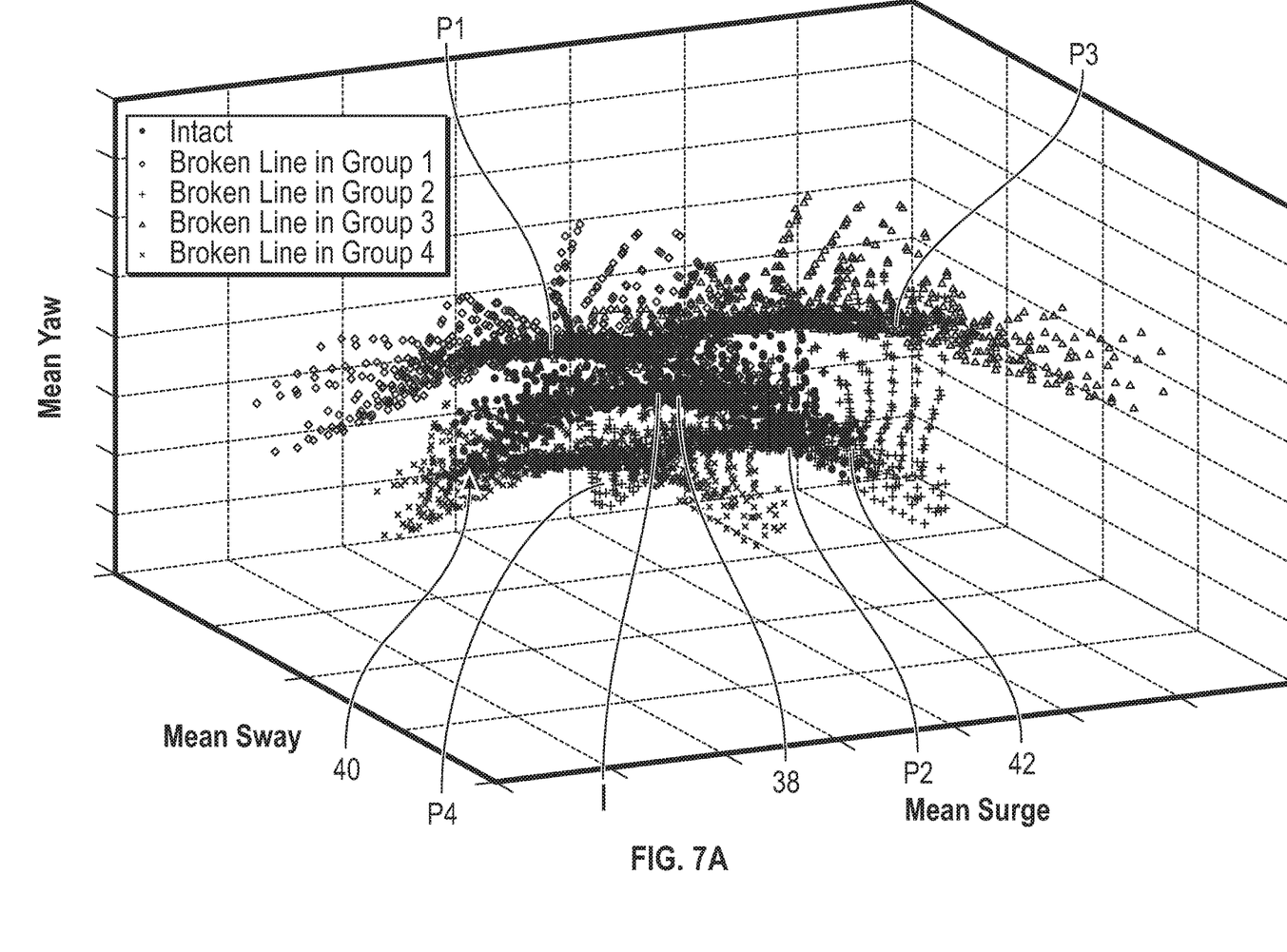
FIG. 7A (and black and white FIG. 7A') is a 3-dimensional schematic chart showing an illustrative plot of a calculated rotational motion model for mean sway on an x-axis, mean surge on a y-axis, and mean yaw on a z-axis of a hull with a mooring system having movement in water with one or more compromised mooring lines referenced in FIG. 4.
Figure 7B:
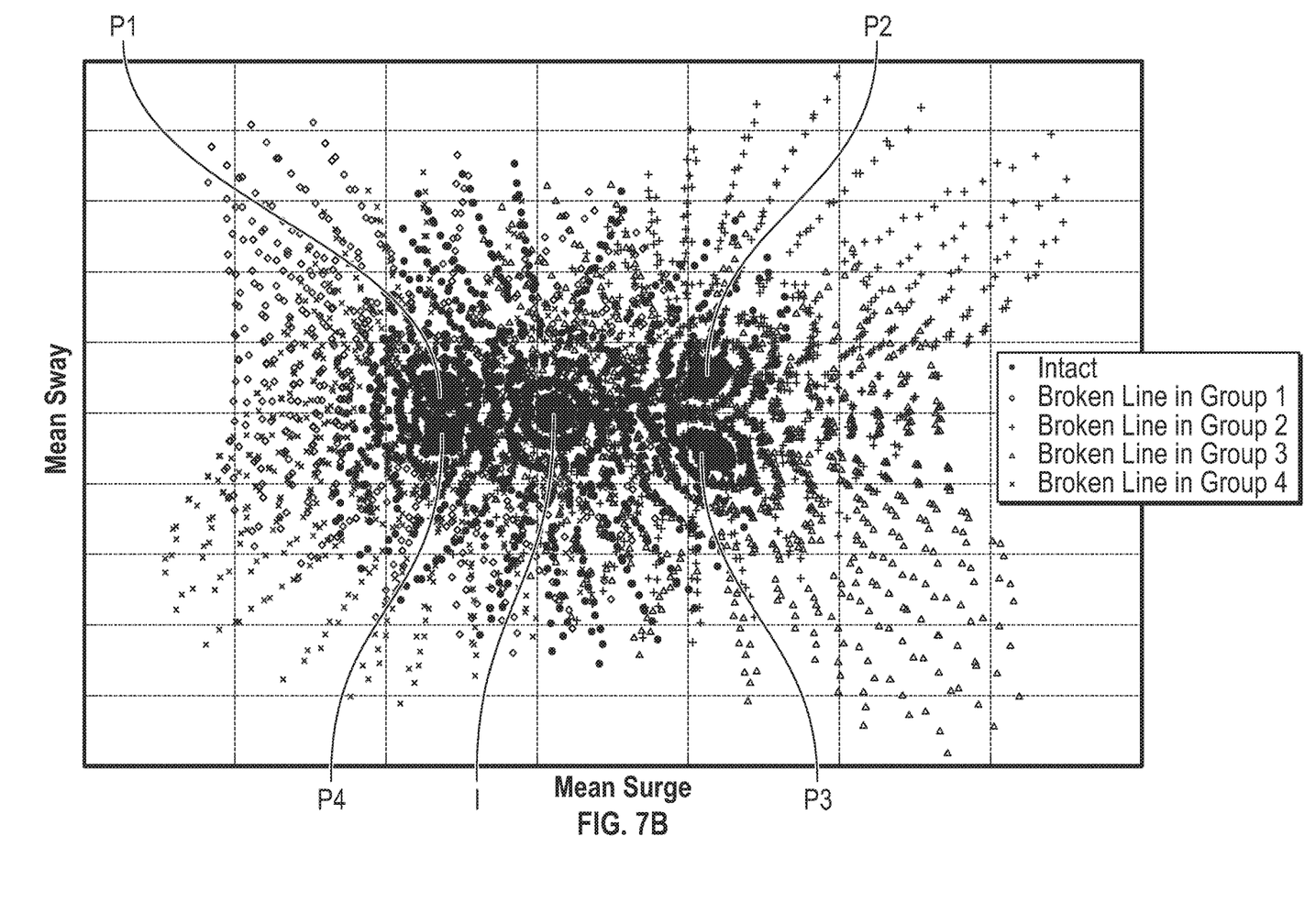
FIG. 7B (and black and white FIG. 7B') is a 2-dimensional schematic chart showing the illustrative plot of a calculated rotational motion model of FIG. 7A of mean sway on an x-axis and mean surge on a y-axis of a hull with a mooring system having movement in water with one or more compromised mooring lines referenced in FIG. 4.

FIG. 7A is a 3-dimensional schematic chart showing an illustrative plot of a calculated rotational motion model for mean sway on an x-axis, mean surge on a y-axis, and mean yaw on a z-axis of a hull with a mooring system having movement in water with one or more compromised mooring lines referenced in FIG. 4. FIG. 7B is a 2-dimensional schematic chart showing the illustrative plot of a calculated rotational motion model of FIG. 7A of mean sway on an x-axis and mean surge on a y-axis of a hull with a mooring system having movement in water with one or more compromised mooring lines referenced in FIG. 4. The chart shows five patterns to illustrate the change in yaw as one of the hull rotational motions in relation to a given sway and surge. Pattern I (black when viewed in color) illustrates the hull rotational motion when the mooring lines are intact and functioning as designed. When the mooring lines are intact and functioning as designed, the pattern I is shown displayed in the approximate middle of the chart. Pattern P1 (blue when viewed in color) illustrates the changed hull rotational motion when one or more mooring lines in MG1 are compromised that generally shifts the hull motion to the top left of the mooring schematic diagram shown in FIG. 4. Pattern P2 (green when viewed in color) illustrates the changed hull rotational motion when one or more mooring lines in MG2 are compromised that generally shifts the hull motion to the top right of the mooring schematic diagram shown in FIG. 4. Pattern P3 (red when viewed in color) illustrates the changed hull rotational motion when one or more mooring lines in MG3 are compromised that generally shifts the hull motion to the bottom right of the mooring schematic diagram shown in FIG. 4. Pattern P4 (pink when viewed in color) illustrates the changed hull rotational motion when one or more mooring lines in MG4 are compromised that generally shifts the hull motion to the bottom left of the mooring schematic diagram shown in FIG. 4.

The patterns generally have a central core zone 38 that indicates less motion and calmer seas. The yaw of the core zone 38 in calmer seas can indicate which mooring group is compromised and potentially the severity, corrective actions to be taken if advised. As shown in FIGS. 7A and 7B, the position of the core zone in calmer seas indicates which mooring group is compromised and potentially the severity, so that corrective action can be taken if advised. In heavier seas as the sway and/or surge increases, the patterns begin to spread in intensity, as illustrated by the spread data in spread zones 40 and 42 extending from the core zone 38. As the patterns spread, the patterns begin to overlap, so that the data points in different mooring groups comingle. Under those conditions, the yaw can be insufficient alone for these modelled conditions (and similarly other rotational motions of roll and pitch individually under other conditions) to determine the condition of the mooring lines and if compromised, which mooring line(s) are compromised. One or more of the other rotational motions can be used in addition to or in lieu of the current rotational motion to have better clarity of the mooring system integrity and location of any compromised mooring lines.

Figure 8:
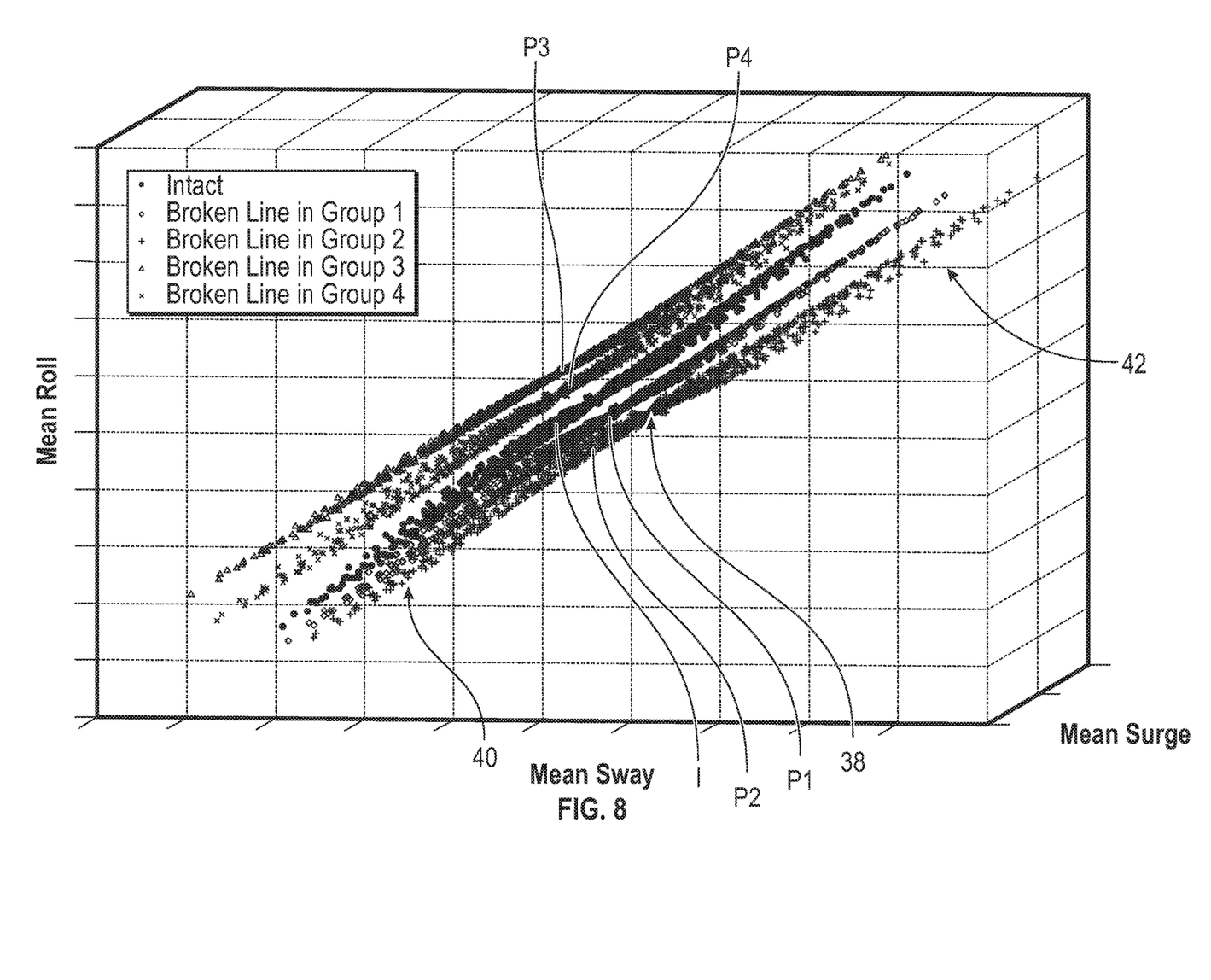
FIG. 8 (and black and white FIG. 8') is a 3-dimensional schematic chart showing an illustrative plot of a calculated rotational motion model of mean sway on an x-axis, mean surge on a y-axis, and mean roll on a z-axis of a hull with a mooring system having movement in water with one or more compromised mooring lines referenced in FIG. 4.

FIG. 8 is a 3-dimensional schematic chart showing an illustrative plot of a calculated rotational motion model of mean sway on an x-axis, mean surge on a y-axis, and mean roll on a z-axis of a hull with a mooring system having movement in water with one or more compromised mooring lines referenced in FIG. 4. FIG. 8 focuses on the roll as one of the hull rotational motions under the same conditions as the yaw in FIGS. 7A and 7B, and the patterns are similarly labelled. The patterns generally have a central core zone 38 that indicates less motion and calmer seas. The roll of the core zone in calmer seas indicates which mooring group is compromised and potentially the severity to that corrective actions can be taken For the particular modelled conditions, in heavier seas as the sway and/or surge increases, the patterns begin to spread in intensity, as illustrated by the spread data in spread zones 40 and 42 extending from the core zone 38. However, the spread effect does not cause the patterns to have significant overlap other than a potential overlap between portions of the patterns P1 and pattern P2 in spread zone 42. In the modelled conditions, the patterns still maintains some separation from each other even as they spread with more intense conditions. Under the modelled conditions, the roll can be sufficient alone to determine the condition of the mooring groups and if compromised, which mooring group is compromised. If more accuracy is desired, one can input or measure one or more of the other rotational motion parameters for better clarity on the condition of the mooring system and location of any compromised mooring lines.

Figure 9:
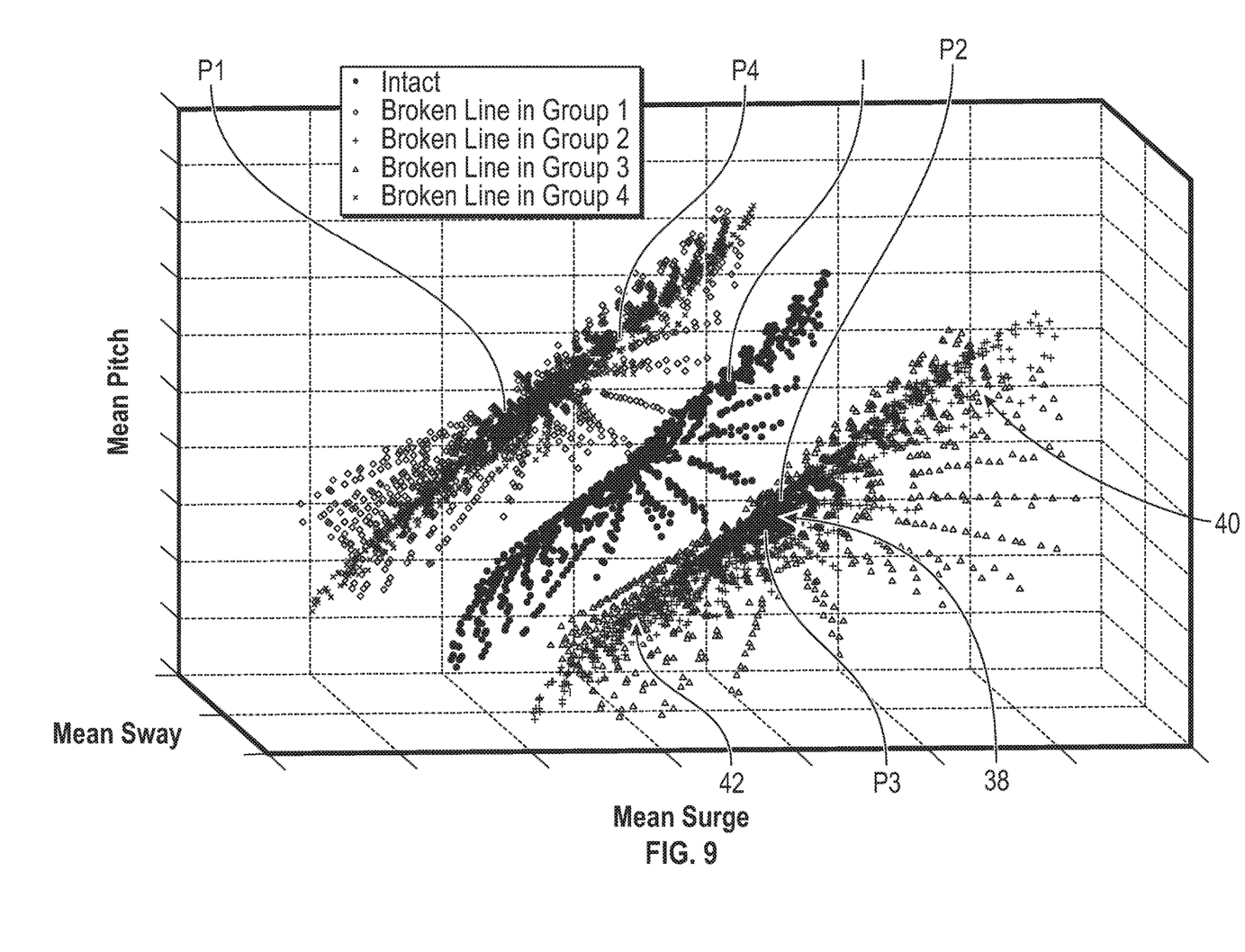
FIG. 9 (and black and white FIG. 9') is a 3-dimensional schematic chart showing an illustrative plot of a calculated rotational motion model of mean sway on an x-axis, mean surge on a y-axis, and mean pitch on a z-axis of a hull with a mooring system having movement in water with one or more compromised mooring lines referenced in FIG. 4.

FIG. 9 is a 3-dimensional schematic chart showing an illustrative plot of a calculated rotational motion model of mean sway on an x-axis, mean surge on a y-axis, and mean pitch on a z-axis of a hull with a mooring system having movement in water with one or more compromised mooring lines referenced in FIG. 4. FIG. 9 focuses on the pitch as one of the hull rotational motions under the same conditions as the yaw in FIGS. 7A and 7B and the roll in FIG. 8, and the patterns are similarly labelled. The patterns generally have a central core zone 38 that indicates less motion and calmer seas. For the particular modelled conditions, the pitch of the core zone in calmer seas separates the mooring groups in pairs so that the patterns P1 and P4 are separated from patterns P2 and P3. In heavier seas as the sway and/or surge increases, the patterns begin to spread in intensity, as illustrated by the spread data in spread zones 40 and 42 extending from the core zone 38. However, the spread effect does not cause the pair of patterns P1 and P4 to have significant overlap with the other pair of patterns P2 and P3. In the modelled conditions, the pairs of patterns still maintains separation from each other even as they spread with more intense conditions. Under the modelled conditions, the pitch can be sufficient alone to determine the condition of a pair of the mooring groups and, if compromised, which mooring group is compromised. Thus, if actual data showed a pattern similar to P1 or P4 but not P2 or P3, an operator would understand to focus on the mooring groups MG1 and MG4 for potential corrective repairs. If more accuracy is desired, one can input or measure one or more of the other rotational motion parameters for better clarity on the condition of the mooring system and location of any compromised mooring lines.

In the example charts showing results from modelled conditions, a first analysis if in calm seas might be to analyze the yaw such as shown in FIGS. 7A and 7B for mooring system integrity. In heavy seas when the yaw results become comingled, the roll such as shown in FIG. 8 might be a better indicator of the mooring group condition and, if compromised, which mooring group might need correcting. If the roll analysis indicates a compromised condition of either or both of mooring groups MG1 or MG2 from the patterns P1 and P2 but is not clear which one due to the comingling in some conditions shown on FIG. 8, then a further analysis of the pitch as shown in FIG. 9 can help. FIG. 9 separates patterns P1 and P2 into different pairs and so the actual results would likely be fall into one of the pairs to differentiate between which MG1 or MG2 is comprised. In summary, by looking one or more of the three rotational motions, the mooring system integrity can be monitored. If a compromised conditions occurs, the monitoring system can indicate which mooring group, or at least narrow down which mooring groups, to inspect and correct if advised.

Naturally, with different numbers of mooring groups and systems will create different results, spreads, overlaps, and any pairings or other groupings of patterns, in addition to the differences created by maritime conditions. The charts in the Figures are illustrative of the concepts of using the three rotational hull motions singly and/or in one or more combinations to determine the mooring system integrity. Examples of rotational motions that could be analysed would be yaw, roll, pitch, yaw and roll, yaw and pitch, roll and pitch, and yaw, roll, and pitch.

Figure 10:
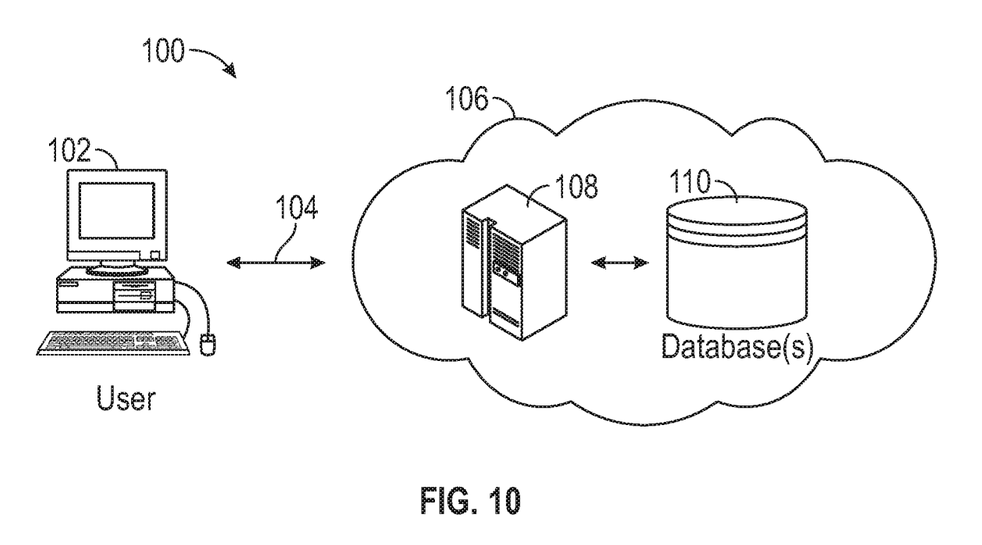
FIG. 10 illustrates an example of a computing system in which the steps for automatically determining the hull rotational motion and monitoring the hull rotational motion, according to the disclosed embodiments.

FIG. 10 illustrates an example of a computing system in which the steps for automatically determining the hull rotational motion and monitoring the hull rotational motion, according to the disclosed embodiments. As can be seen, the system can include at least one user processing device 102 that can be connected via a network connection 104 to a network 106. In the present example, the user processing device 102 may be a desktop computer, notebook computer, tablet, smart phone, and other processing device, and the network connection 104 may be a wired and/or wireless network connection. Alternatively, the processing device 102 may be a stand-alone system that does not interface with a network or network servers. One or more network servers 108 may be connected to the network 106 with at least one database 110, which may be either an internal database that resides within the network servers 108, or a database that resides in a physically separate location from the network servers 108 (as shown here), depending on the constraints (e.g., size, speed, etc.) of the particular implementation. Note that the term "server" is used herein to include conventional servers, as well as high-end computers, workstations, mainframes, supercomputers, and the like. Similarly, the at least one database 110 may be a relational database, operational database, or other suitable database capable of storing data and information, including location information for determining the hull rotational motion and variations from the hull rotational motion.

Figure 11:
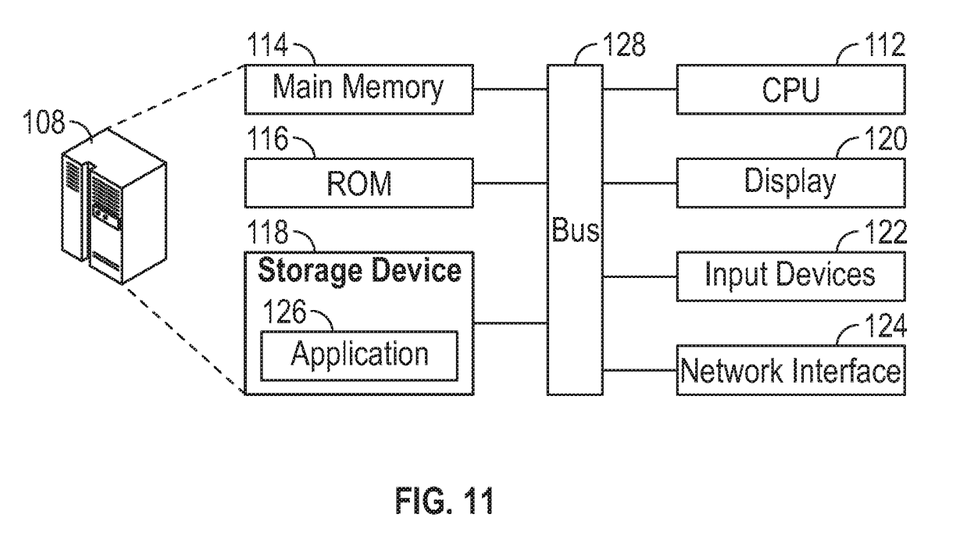
FIG. 11 illustrates an illustrative server that may be used as one of the one or more servers on the computing network.

FIG. 11 illustrates an illustrative server that may be used as one of the one or more servers 108 on the computing network 106. As mentioned earlier, this server 108 may be any suitable data processing system known to those having ordinary skill in the art, including a high-end server, workstation, mainframe, supercomputer, and the like. Such a server 108 typically includes a bus 128 or other communication mechanism for transferring information within the server 108, and a CPU 112 coupled with the bus 128 for processing the information. The server 108 may also include a main memory 114, such as a random access memory ("RAM") or other dynamic storage device coupled to the bus 128 for storing computer-readable instructions to be executed by the CPU 112. The main memory 114 may also be used for storing temporary variables or other intermediate information during execution of the instructions to be executed by the CPU 112. The server 108 may further include a read only memory ("ROM") 116 or other static storage device coupled to the bus 128 for storing static information and instructions for the CPU 112. A computer-readable storage device 118, such as a magnetic disk, optical disk, or solid state memory device, may be coupled to the bus 128 for storing information and instructions for the CPU 112.

The term "computer-readable instructions" as used above refers to any instructions that may be performed by the CPU 112 and/or other components. Similarly, the term "computer-readable medium" refers to any storage medium that may be used to store the computer-readable instructions. Such a medium may take many forms, including, but not limited to, non-volatile media, volatile media, and transmission media. Non-volatile media may include, for example, optical or magnetic disks, such as the storage device 118. Volatile media may include dynamic memory, such as main memory 114. Transmission media may include coaxial cables, copper wire and fiber optics, including wires of the bus 128. Transmission itself may take the form of acoustic or light waves, such as those generated during radio frequency ("RF") and infrared ("IR") data communications. Common forms of computer-readable media may include, for example, a floppy disk, a flexible disk, hard disk, magnetic tape, other magnetic medium, a CD ROM, DVD, other optical medium, a RAM, a PROM, an EPROM, a FLASH EPROM, other memory chip or cartridge, or any other medium from which a computer can read.

The CPU 112 may also be coupled via the bus 128 to a display 120 for displaying information to a user. One or more input devices 122, including alphanumeric and other keyboards, mouse, trackball, cursor direction keys, and so forth, may be coupled to the bus 128 for communicating information and command selections to the CPU 112. A network interface 124 provides two-way data communication between the server 108 and other computers over the network 106. In one example, the network interface 124 may be an integrated services digital network ("ISDN") card or a modem used to provide a data communication connection to a corresponding type of telephone line. As another example, the network interface 124 may be a local area network ("LAN") card used to provide a data communication connection to a compatible LAN. Wireless links may also be implemented via the network interface 124. In summary, the main function of the network interface 124 is to send and receive electrical, electromagnetic, optical, or other signals that carry digital data streams representing various types of information.

In accordance with the disclosed embodiments, an application 126 for determining and/or monitoring the hull rotational motion of the hull, or rather the computer-readable instructions therefor, may also reside on the storage device 118. The computer-readable instructions for the application 116 may then be executed by the CPU 112 and/or other components of the server 108 to determine the hull rotational motion or monitor the compliance of the hull with the hull rotational motion. Such an application 126 may be implemented using any suitable application development environment and programming language known to those having ordinary skill in the art to carry out the steps of the algorithms disclosed and described herein. As noted above, in various embodiments, the application 126 may be a stand-alone application that may be executed independent of other applications, or it may be in the form of a plugin module to an existing software package, and the like.

Other and further embodiments utilizing one or more aspects of the invention described above can be devised without departing from the spirit of Applicant's invention. For example, other types of geographical position determining devices, various equipment such as alarms, software for remote sensing, dedicated software linked to the hull control/alarm system and the like can be used to enhance the operation and notification of the hull rotational motion monitoring system, along with other variations can occur in keeping within the scope of the claims.

Further, the various methods and embodiments of the system can be included in combination with each other to produce variations of the disclosed methods and embodiments. Discussion of singular elements can include plural elements and vice-versa. References to at least one item may include one or more items. Also, various aspects of the embodiments could be used in conjunction with each other to accomplish the understood goals of the disclosure. Unless the context requires otherwise, the word "comprise" or variations such as "comprises" or "comprising," should be understood to imply the inclusion of at least the stated element or step or group of elements or steps or equivalents thereof, and not the exclusion of a greater numerical quantity or any other element or step or group of elements or steps or equivalents thereof. The device or system may be used in a number of directions and orientations. The term "coupled," "coupling," "coupler," and like terms are used broadly herein and may include any method or device for securing, binding, bonding, fastening, attaching, joining, inserting therein, forming thereon or therein, communicating, or otherwise associating, for example, mechanically, magnetically, electrically, chemically, operably, directly or indirectly with intermediate elements, one or more pieces of members together and may further include without limitation integrally forming one functional member with another in a unity fashion. The coupling may occur in any direction, including rotationally.

The invention has been described in the context of preferred and other embodiments and not every embodiment of the invention has been described. Obvious modifications and alterations to the described embodiments are available to those of ordinary skill in the art. The disclosed and undisclosed embodiments are not intended to limit or restrict the scope or applicability of the invention conceived of by the Applicant, but rather, in conformity with the patent laws, Applicant intends to protect fully all such modifications and improvements that come within the scope or range of equivalents of the following claims.

What is claimed is:

1. A method of monitoring for changes in a mooring system for a floating hull, the mooring system having at least one mooring line coupled between the hull and an anchor having a mooring point to which the at least one mooring line is coupled, the method comprising:
   determining and recording a geographical position of a locating point on the hull to establish a baseline geographical position;
   determining and recording at least one type of an associated rotational motion of the hull at the baseline geographical position to establish an associated baseline hull rotational motion; and
   comparing an operational geographical position and associated hull rotational motion to reference data of a baseline geographical position and associated baseline hull rotational motion corresponding to an undamaged mooring system to provide an indication of a change in the mooring line stiffness, mooring line pre-tension, the anchor location, or a combination thereof.

2. The method of claim 1, wherein the rotational motion includes at least one of the hull yaw, roll, and pitch motions, and any combination thereof.

3. The method of claim 1, wherein comparing the operational geographical position and associated hull rotational motion to reference data of the baseline geographical position and associated baseline hull rotational motion comprises using an inertial motion unit.

4. The method of claim 3, wherein using the inertial motion unit comprises using at least one of an accelerometer, a gyroscope, or a magnetometer of the inertial motion unit.

5. The method of claim 4, wherein using the inertial motion unit comprises using at least one of an accelerometer, a gyroscope, or a magnetometer of the inertial motion unit for each hull axis.

6. The method of claim 1, wherein comparing the operational geographical position and associated hull rotational motion to reference data of the baseline geographical position and associated baseline hull rotational motion comprises comparing a plurality of the hull yaw, roll, and pitch motions, or any combination thereof.

7. The method of claim 1, wherein:
   determining and recording the at least one type of an associated rotational motion of the hull at the baseline geographical position to establish the associated baseline hull rotational motion comprises determining multiple degrees of freedom of movement of the hull at the baseline geographical position, and
   wherein comparing the operational geographical position and associated hull rotational motion to reference data of the baseline geographical position and associated baseline hull rotational motion comprises determining multiple degrees of freedom of movement of the hull at the operational geographical position.

8. The method of claim 1, further comprising comparing the operational geographical position and associated hull rotational motion to reference data corresponding to a damaged mooring system to indicate the mooring line or anchor that has changed.

9. The method of claim 1, wherein at least one geographical position of the locating point is determined by means of a satellite positioning system.

10. The method of claim 1, further comprising comparing the operational geographical position and associated hull rotational motion to the baseline geographical position and associated baseline hull rotational motion independent of operational environmental conditions.

11. The method of claim 1, wherein the method further comprises determining at least one of the geographical positions with an inertial motion unit.

12. The method of claim 11, wherein the comparison of the operational geographical position of the hull to an expected geographical position of the set includes measuring the excursion of the hull from the expected geographical position.

13. The method of claim 1, wherein the method further comprises:
recording the geographical position and associated hull rotational motions of the hull over time in order to establish at least a portion of the reference data with a set of expected geographical positions and associated hull rotational motions of the hull; and
comparing the operational geographical position and associated hull rotational motion to the set of expected geographical positions and associated hull rotational motions of the hull.

14. The method of claim 1, further comprising recording geographical positions and associated hull rotational motions of the hull over time to cumulate fatigue of hull components directly affected by motions of the hull.

15. A data processing system configured to carry out the method of claim 1.

16. A computer software configured to provide instructions to a data processing apparatus to carry out the method of claim 1.

17. A method of monitoring the mooring line stiffness shift, mooring line material creeping of a moored hull, or a combination thereof, the hull having a mooring point to which the mooring line is connected, the method comprising:
determining a geographical position and at least one type of an associated hull rotational motion of the hull; and
using a determined shift in the geographical position and associated hull rotational motion to determine the stiffness variation of the mooring lines.

18. A method of monitoring the riser/export system stiffness shift of a moored hull having a mooring point to which the mooring line is connected, the method comprising:
determining a geographical position and at least one type of an associated hull rotational motion of the hull; and
using a determined shift in the geographical position and associated hull rotational motion to determine the stiffness variation of the riser/export system.

19. A system for monitoring for changes in a mooring system for a floating hull, the mooring system having at least one mooring line coupled between the hull and an anchor having a mooring point to which the at least one mooring line is coupled, the system comprising a satellite positioning device and a data processing system configured to:
determine a geographical position of a locating point on the hull from the satellite positioning device;
determine at least one type of an associated hull rotational motion of the hull at the given geographical position; and
compare the geographical position of the hull and its associated hull rotational motion to an expected set of data to provide an indication of a stiffness of the mooring line or a change of the anchor.

* * * * *